(12) United States Patent
Yue et al.

(10) Patent No.: US 11,860,079 B2
(45) Date of Patent: Jan. 2, 2024

(54) PARALLEL CORE SIMULATION DEVICE FOR COMMINGLING PRODUCTION IN LOW-PERMEABILITY GAS RESERVOIRS

(71) Applicant: SOUTHWEST PETROLEUM UNIVERSITY, Sichuan (CN)

(72) Inventors: Ping Yue, Chengdu (CN); Zhiwei Xie, Sichuan (CN); Shenchao Luo, Korla (CN); Wensheng Xu, Korla (CN); Pengyu Chen, Beijing (CN); Wenbing Gao, Xi'an (CN); Guanglei Ren, Zhengzhou (CN); Qingsong Gao, Zhengzhou (CN); Tao Lei, Zhengzhou (CN); Xiaofan Chen, Chengdu (CN); He Qiu, Chengdu (CN); Bingyi Jia, Chengdu (CN)

(73) Assignee: SOUTHWEST PETROLEUM UNIVERSITY, Chengdu (CN)

(*) Notice: Subject to any disclaimer, the term of this patent is extended or adjusted under 35 U.S.C. 154(b) by 456 days.

(21) Appl. No.: 17/134,468

(22) Filed: Dec. 27, 2020

(65) Prior Publication Data
US 2021/0116352 A1    Apr. 22, 2021

Related U.S. Application Data

(63) Continuation of application No. PCT/CN2019/107259, filed on Sep. 23, 2019.

(30) Foreign Application Priority Data

Jan. 14, 2019 (CN) .......................... 201910032777.9

(51) Int. Cl.
*G01N 15/08* (2006.01)
*E21B 41/00* (2006.01)

(52) U.S. Cl.
CPC ........... *G01N 15/082* (2013.01); *E21B 41/00* (2013.01)

(58) Field of Classification Search
CPC .. G01N 15/082; G01N 15/0826; E21B 41/00; E21B 25/005
See application file for complete search history.

(56) References Cited

U.S. PATENT DOCUMENTS

2005/0150273 A1    7/2005   Potter

FOREIGN PATENT DOCUMENTS

| CN | 106640060 A | 5/2017 |
| CN | 107764510 A | 3/2018 |

(Continued)

OTHER PUBLICATIONS

Yang Peng; Study of the Physical Model of Single Well Commingling Production in the Low Pressure and Tight Gas Reservoirs and Geologic Agent Analysis-Taken Daniudi Gas Field as an Example; Basic Sciences, China Master's Theses Full-Text Database), No. 04, Apr. 15, 2012.

*Primary Examiner* — Tarun Sinha

(57) ABSTRACT

A parallel core simulation device for commingling production in low-permeability gas reservoirs includes a gas supercharger configured to provide a high pressure gas to simulate a fluid in a gas reservoir, a plurality of core holders arranged in parallel, a thermostat configured to control a temperature of each core holder to simulate a temperature of the gas reservoir, a pressure pump configured to control a pressure applied to each core holder to simulate a confining pressure of the gas reservoir, a first back-pressure valve communicated with each core holder, a fully-automatic gas meter configured to measure a rate and a volume of gas production and a second hydraulic pump configured to simulate a part of a gas well Christmas Tree.

10 Claims, 1 Drawing Sheet

(56) References Cited

FOREIGN PATENT DOCUMENTS

| | | | |
|---|---|---|---|
| CN | 108505979 | A | 9/2018 |
| CN | 109668814 | A | 4/2019 |
| CN | 209416878 | U | 9/2019 |

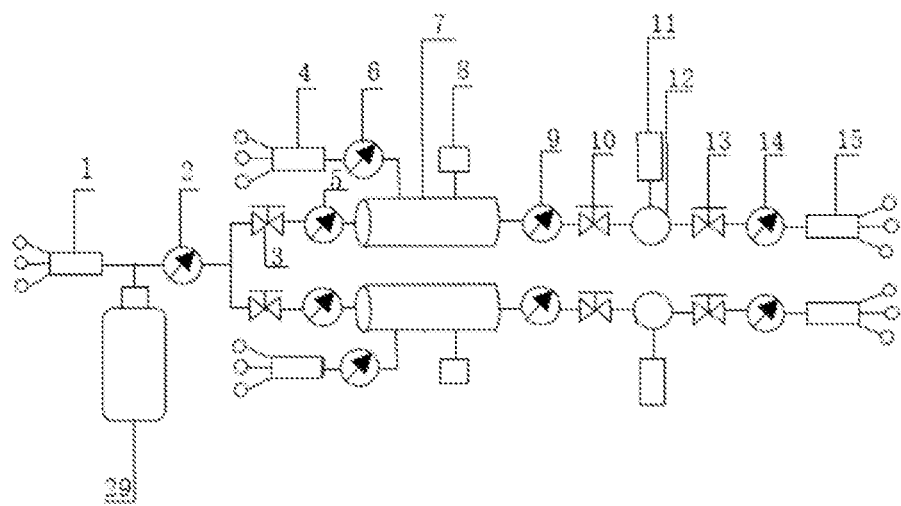

PARALLEL CORE SIMULATION DEVICE FOR COMMINGLING PRODUCTION IN LOW-PERMEABILITY GAS RESERVOIRS

CROSS-REFERENCE TO RELATED APPLICATIONS

This application is a continuation of International Patent Application No. PCT/CN2019/107259, filed on Sep. 23, 2019, which claims the benefit of priority from Chinese Patent Application No. 201910032777.9, filed on Jan. 14, 2019. The content of the aforementioned application, including any intervening amendments thereto, is incorporated herein by reference in its entirety.

TECHNICAL FIELD

The present application relates to a core simulation device for gas collection in a low-permeability gas reservoir, and more particularly to a parallel core simulation device for commingling production in low-permeability gas reservoirs.

BACKGROUND

A low-permeability gas reservoir refers to a tight reservoir with low permeability. It has a special geological condition, and is characterized by low porosity, high water saturation, strong heterogeneity, low pressure and low production, etc. These characteristics greatly influence the exploitation of a considerable number of reserves. In the middle and late stages of gas reservoir exploitation, the exploitation of the low-permeability gas reservoir and the tight gas reservoir has urgent problems to be solved, that is, how to adjust the exploitation manner, improve exploitation measures and prolong the stable production period of gas reservoirs.

For low-porosity and low-permeability gas reservoirs, many production wells currently adopt commingling production for the improvement of single well productivity and exploitation benefits. The research on gas production characteristics is carried out mainly by numerical simulation and well test analysis. However, the uncertainty of modeling data, data error and incomplete understanding of geology in the early stage of exploitation lead to the deviation between the geological model and the actual situation, so the obtained numerical simulation results are inaccurate, in other words, the simulation of the low-permeability gas reservoir is not accurate enough.

Moreover, the current parallel core experimental device cannot independently control the temperature, the confining pressure and the inlet and outlet pressures, and the gas volume is measured by a drainage method, as a result, the obtained results have large errors. Therefore, it is required to develop a complete and accurate simulation device for the commingling production of the low-permeability gas reservoir.

SUMMARY

An object of the present application is to provide a parallel core simulation device for commingling production in low-permeability gas reservoirs, which effectively avoids the system error in the exiting device caused by the dissolving of the gas in water. In the present application, the gas flow measurement in parallel effectively avoids the measurement error caused by small gas flow.

The technical solutions of the present application are described as follows.

The present application provides a parallel core simulation device for commingling production in low-permeability gas reservoirs, comprising:
 a gas supercharger configured to provide a high pressure gas to simulate a fluid in a gas reservoir;
 a plurality of core holders arranged in parallel, communicated with the gas supercharger and configured to clamp a core;
 a thermostat configured to control a temperature of each core holder to simulate a temperature of the gas reservoir;
 a pressure pump configured to control a pressure applied to each core holder to simulate a confining pressure of the gas reservoir;
 a first back-pressure valve communicated with each core holder;
 a fully-automatic gas meter communicated with the first back-pressure valve and configured to measure a rate and a volume of gas production; and
 a second hydraulic pump communicated with the first back-pressure valve and configured to simulate a part of a gas well Christmas Tree;
 wherein a first pressure gauge is arranged between the gas supercharger and a plurality of core clamping components; and the plurality of core clamping components are arranged in parallel;
 an air inlet end of each core holder is provided with a first check valve and a fourth pressure gauge; an air outlet end of each core holder is provided with a fifth pressure gauge and a second check valve; and a third pressure gauge is provided on a high-pressure pipeline between each core holder and the pressure pump;
 a third check valve and a second pressure gauge are provided between the first back-pressure valve and the second hydraulic pump; and
 a pressure and a flow rate of each core holder at its air inlet end are controllable during use by the second hydraulic pump for production simulation.

In some embodiments, the gas supercharger comprises a first hydraulic pump and a gas storage tank; and
 the gas storage tank is communicated with the first hydraulic pump and communicated with the plurality of core holder.

In some embodiments, the first pressure gauge is provided between the gas storage tank and the plurality of core holders.

In some embodiments, the first pressure gauge, the second pressure gauge, the fourth pressure gauge and the fifth pressure gauge each are a wireless digital pressure gauge.

In some embodiments, the wireless digital pressure gauge is a ZHT-300 wireless digital pressure gauge.

In some embodiments, the wireless digital pressure gauge is wirelessly connected to a control system.

In some embodiments, the thermostat is an electronic thermostat.

In some embodiments, the thermostat has a temperature control range of 15° C.-150° C.

In some embodiments, an outer sidewall of the core holders is applied with a thermal insulation layer.

In some embodiments, a high-pressure pipeline is provided for the communication between the gas supercharger and the plurality of core holders, the communication between each core holder and the first back-pressure valve and the communication between the first back-pressure valve and the second hydraulic pump, respectively.

Compared to the prior art, the parallel core simulation device of the present application has the following advantages.

1) In the parallel core simulation device of the present application, the measurement results have a small error, as opposed to that in the existing simulation device.

2) The parallel core simulation device of the present application can accurately simulate the exploitation of the low-permeability gas reservoir under a preset temperature and pressure. The cores can be always kept at the preset temperature during the experiment by the electronic thermostat, so as to eliminate the influence of the temperature variation to the experimental results.

3) Due to the thermal insulation layer, there is less internal and external heat exchange, so as to prevent scalding. Respective pressure gauges in the present application are a wireless pressure gauge such that laboratory data can be automatically transmitted to the computer without manual reading. The check valve mounted in the experimental device ensures that the gas flows in only one direction in the experimental device.

4) The device of the present application carries out the simulation of the commingling production of the gas reservoirs using the cores in parallel. The temperature, the confining pressure, and the inlet and outlet pressures of each of the cores in parallel can be independently controlled. In addition, a check valve is provided at the outlet end of each of the cores in parallel, thereby realizing the commingling production and a single-layer simulation under different pressures and different replacement timings for a low-permeability multi-layer reservoir.

5) The cores in parallel are greatly different in physical properties and gas production. A fully-automatic gas meter is provided at an outlet end of each core holder such that the core holders can be respectively measured to obtain their gas production output, thereby solving the independent measurement problem. In addition, during gas recovery by liquid drainage, the gas flow of each core holder at the outlet end is very small, and such parallel arrangement can effectively avoid the system error caused by the dissolving of the gas in water, which is of great significant to more truly understand the seepage characteristics and determine the optimal time of the commingling production of the low-permeability gas reservoirs.

BRIEF DESCRIPTION OF THE DRAWINGS

FIG. 1 is a schematic diagram of a parallel core simulation device for commingling production in low-permeability gas reservoirs of the present disclosure.

DETAILED DESCRIPTION OF EMBODIMENTS

The present disclosure will be further clearly and completely described below with reference to the accompanying drawings and the embodiments. Obviously, the embodiments disclosed herein are only a part of embodiments of the present disclosure. Based on the embodiments of the present disclosure, all other embodiments obtained by a person of ordinary skill in the art without making creative efforts should fall within the scope of the present disclosure.

A parallel core simulation device for commingling production in low-permeability gas reservoirs includes a gas supercharger configured to provide a high pressure gas to simulate a fluid in a gas reservoir, a plurality of core holders 7 arranged in parallel, communicated with the gas supercharger and configured to clamp a core; a thermostat 8 configured to control a temperature of each core holder 7 to simulate a temperature of the gas reservoir; a pressure pump 4 configured to control a pressure applied to each core holder 7 to simulate a confining pressure of the gas reservoir; a first back-pressure valve 12 communicated with each core holder 7 and configured to control a pressure of the core at an outlet; a fully-automatic gas meter 11 communicated with the first back-pressure valve 12 and configured to measure a rate and a volume of gas production; and a second hydraulic pump 15 communicated with the first back-pressure valve 12 and configured to simulate a part of a gas well Christmas Tree.

In some embodiments, a first pressure gauge 2 is arranged between the gas supercharger and a plurality of core clamping components, and the plurality of core clamping components are arranged in parallel.

In some embodiments, an air inlet end of each core holder 7 is provided with a first check valve 3 and a fourth pressure gauge 5. An air outlet end of each core holder 7 is provided with a fifth pressure gauge 9 and a second check valve 10. A third pressure gauge 6 is provided on a high-pressure pipeline between each core holder 7 and the pressure pump 4.

In some embodiments, a third check valve 13 and a second pressure gauge 14 are provided between the first back-pressure valve 12 and the second hydraulic pump 15.

In use, a pressure and a flow rate of each core holder 7 at the air inlet end are controllable by the second hydraulic pump 15 for production simulation. Simulated herein are two production modes: constant pressure with decreased output and constant output with decreased pressure. In the case of the constant pressure with decreased output, the back-pressure valve is continuously pressurized by the second hydraulic pump 15, at this time, the production output decreases. In the case of the constant output with decreased pressure, as the gas is collected, the remained gas decreases, and the pressure will gradually decrease, so a decrease in the pressure of the second hydraulic pump 15 can stabilize the production output.

In some embodiments, the gas supercharger includes a first hydraulic pump 1 and a gas storage tank 29. The gas storage tank 29 is communicated with the first hydraulic pump 1 and communicated with the plurality of core holders 7.

In some embodiments, the first pressure gauge 2 is provided between the gas storage tank 29 and the plurality of core holders 7.

In some embodiments, the first pressure gauge 2, the fourth pressure gauge 5, the fifth pressure gauge 9 and the second pressure gauge 14 each are a wireless digital pressure gauge.

In some embodiments, the wireless digital pressure gauge is a ZHT-300 wireless digital pressure gauge.

In some embodiments, the wireless digital pressure gauge is wirelessly connected to a control system.

In some embodiments, the thermostat 8 is an electronic thermostat.

In some embodiments, the thermostat 8 has a temperature control range of 15° C.-150° C.

In some embodiments, an outer sidewall of the core holders 7 is applied with a thermal insulation layer.

In some embodiments, a high-pressure pipeline is provided for the communication between the gas supercharger and the plurality of core holders 7, the communication between each core holder 7 and the first back-pressure valve 12 and the communication between the first back-pressure valve 12 and the second hydraulic pump 15, respectively.

The check valve in the device is configured to prevent backflow of gas, and the respective pressure gauges are configured to measure the pressure.

The parallel core simulation device of the present application will be further described in detail below with reference to an embodiment.

As shown in FIG. 1, a parallel core simulation device for commingling production in low-permeability gas reservoirs includes a first hydraulic pump 1, a gas storage tank 29 and two core clamping components arranged in parallel.

Through a high-pressure pipeline, the first hydraulic pump 1 is communicated with the gas storage tank 29, and communicated with the two core clamping components. The gas storage tank 29 is arranged between the first hydraulic pump 1 and the two core clamping components. The gas supercharger includes the gas storage tank 29 and the first hydraulic pump 1, and is configured to provide a high pressure gas to simulates a fluid in a gas reservoir. The high pressure gas is stored in the gas storage tank 29. The first hydraulic pump 1 is configured to provide pressure to transfer the high pressure gas from the gas storage tank 29 to the two core clamping components.

The high-pressure pipeline between the first hydraulic pump 1 and the two core clamping components is provided with a pressure gauge 2.

The two core clamping components are configured to simulate a gas reservoir environment. Each core clamping component includes a first check valve 3, a fourth pressure gauge 5, a core holder 7, a fifth pressure gauge 9, a second check valve 10, a first back-pressure valve 12, a third check valve 13, a second pressure gauge 14 and a second hydraulic pump 15, which are communicated in sequence through the high-pressure pipeline.

The core clamping component further includes a pressure pump 4 and a thermostat 8 which are communicated with the core holder 7 through the high-pressure pipeline.

A third pressure gauge 6 is provided on the high-pressure pipeline between the core holder 7 and the pressure pump 4. The first back-pressure valve 12 is communicated with a fully-automatic gas meter 11 through the high-pressure pipeline. The fully-automatic gas meter 11 (type NSPTZDQLY) can measure both of a rate and a volume of the gas production with a measurement error of less than 1%.

The thermostat 8 is an electronic thermostat and is configured to heat the core holder 7 by a ribbon heater to simulate a temperature of the gas reservoir. The thermostat 8 has a temperature control range of 15° C.-150° C. and a temperature control accuracy of 0.1° C. The electronic thermostat keeps the core at a set temperature during the experiment, thereby eliminating the influence of the temperature variation to experimental results.

The pressure pump 4 is configured to simulate a confining pressure of the gas reservoir, and has a maximum pressure of 100 MPa.

The core holder 7 is configured to clamp the core. An outer sidewall of the core holder 7 is applied with a thermal insulation layer. The core is subjected to a temperature and a pressure by the thermostat 8 and the pressure pump 4 to simulate a state that the core is under the formation. Due to the thermal insulation layer, there is less internal and external heat exchange, so as to prevent scalding.

The fourth pressure gauge 5 indicates a reservoir forming pressure, and the fifth pressure gauge 9 indicates a flow pressure at a bottom of a well during the simulation of the gas production. The first check valve 3 and the second check valve 10 control the flow of gas.

The first pressure gauge 2, the fourth pressure gauge 5, the fifth pressure gauge 9 and the second pressure gauge 14 each are a wireless digital pressure gauge which may be a ZHT-300 wireless digital pressure gauge. A pressure measurement range thereof is 10 KPa-250 MPa, and an accuracy thereof is 0.1. The wireless digital pressure gauge is wirelessly connected to a computer, in other words, the experimental data during the simulation can be automatically transmitted to the computer without manual reading.

The first check valve 3, the second check valve 10 and the third check valve 13 ensure that the gas flows in only one direction in the device, so as to improve the measurement accuracy. The selection of the specification of the first, second and third check valves depends on the selected core in the simulation, and specifically, the first, second and third check valves may have a specification of Φ25×1000 mm.

The second hydraulic pump 15 is arranged at an end of each core clamping component to provide back-pressure to simulate a part of a gas well Christmas Tree, so that a pressure and a flow rate of an air inlet end of the core holder 7 can be controlled, thereby simulating two production modes, i.e., constant pressure with decreased output and constant output with decreased pressure.

The high-pressure pipeline is pressure-resistant and made of steel.

The working principle of the parallel core simulation device of the present application is described as follows.

Two cores to be measured are placed into two core holders 7 arranged in parallel and are subjected to a pressure by the pressure pump 4 to simulate the confining pressure. When a pressure value displayed on the third pressure gauge 6 reaches an experimental pressure, the pressure pump 4 is turned off, and the thermostat 8 is turned on to heat each core to a desirable temperature, and the core is always kept at this temperature during the experiment.

After the two cores are heated, the first check valve 3 and the second check valve 10 are opened. The first hydraulic pump 1 operates, so that the two cores are saturated with a high pressure experimental gas. When initial conditions such as a temperature and a pressure required herein become stabilized, the first hydraulic pump 1 stops working, and the simulated production starts. At the same time, the second hydraulic pump 15 operates to control both of a rate and a volume of gas production.

By controlling the time that the second check valve 10 at the outlet starts, two-layered commingling production in succession at different times is simulated. Respective wireless pressure gauges transmit the measurement data to a computer in real time.

The device of the present application carries out the simulation of the commingling production of the gas reservoirs using the cores in parallel. The temperature, the confining pressure, and the inlet and outlet pressures of each of the cores in parallel can be independently controlled. In addition, a check valve is provided at the outlet end of each of the cores in parallel, thereby realizing the commingling production and a single-layer simulation under different pressures and different replacement timings for a low-permeability multi-layer reservoir.

The cores in parallel are greatly different in physical properties and gas production. A fully-automatic gas meter is provided at an outlet end of each core holder 7 such that the two core clamping components arranged in parallel can be respectively measured to obtain their gas production output, thereby solving the independent measurement problem. In addition, during gas recovery by liquid drainage, the gas flow of each core holder 7 at the outlet end is very small, and such parallel arrangement can effectively avoid the system error caused by the dissolving of the gas in water, which is of great significant to more truly understand the seepage characteristics and determine the optimal time of the commingling production of the low-permeability gas reservoirs.

The above are only the preferred embodiments of the present disclosure, and are not intended to limit the scope of the present disclosure. Any modifications and replacements made by those skilled in the art without departing from the spirit of the present disclosure shall fall within the scope of the present disclosure. The scope of the present disclosure is defined by the appended claims.

What is claimed is:

1. A parallel core simulation device for commingling production in a low-permeability gas reservoir, comprising:
    a gas supercharger configured to provide a high pressure gas to simulate a fluid in a gas reservoir;
    a plurality of core holders arranged in parallel, communicated with the gas supercharger and configured to clamp a core;
    a thermostat configured to control a temperature of each core holder to simulate a temperature of the gas reservoir;
    a pressure pump configured to control a pressure applied to each core holder to simulate a confining pressure of the gas reservoir;
    a first back-pressure valve communicated with each core holder;
    a fully-automatic gas meter communicated with the first back-pressure valve and configured to measure a rate and a volume of gas production; and
    a second hydraulic pump communicated with the first back-pressure valve and configured to simulate a part of a gas well Christmas Tree;
    wherein a first pressure gauge is arranged between the gas supercharger and a plurality of core clamping components; and the plurality of core clamping components are arranged in parallel;
    an air inlet end of each core holder is provided with a first check valve and a fourth pressure gauge; an air outlet end of each core holder is provided with a fifth pressure gauge and a second check valve; and a third pressure gauge is provided on a high-pressure pipeline between each core holder and the pressure pump;
    a third check valve and a second pressure gauge are provided between the first back-pressure valve and the second hydraulic pump; and
    a pressure and a flow rate of each core holder at its air inlet end are controllable during use by the second hydraulic pump for production simulation.

2. The parallel core simulation device of claim 1, wherein the gas supercharger comprises a first hydraulic pump and a gas storage tank; and
    the gas storage tank is communicated with the first hydraulic pump and communicated with the plurality of core holders.

3. The parallel core simulation device of claim 2, wherein the first pressure gauge is provided between the gas storage tank and the plurality of core holders.

4. The parallel core simulation device of claim 1, wherein the first pressure gauge, the second pressure gauge, the fourth pressure gauge and the fifth pressure gauge each are a wireless digital pressure gauge.

5. The parallel core simulation device of claim 4, wherein the wireless digital pressure gauge is a ZHT-300 wireless digital pressure gauge.

6. The parallel core simulation device of claim 4, wherein the wireless digital pressure gauge is wirelessly connected to a control system.

7. The parallel core simulation device of claim 1, wherein the thermostat is an electronic thermostat.

8. The parallel core simulation device of claim 1, wherein the thermostat has a temperature control range of 15° C.-150° C.

9. The parallel core simulation device of claim 1, wherein an outer sidewall of each core holder is applied with a thermal insulation layer.

10. The parallel core simulation device of claim 1, wherein a high-pressure pipeline is provided for the communication between the gas supercharger and the plurality of core holders, the communication between each core holder and the first back-pressure valve and the communication between the first back-pressure valve and the second hydraulic pump, respectively.

* * * * *